United States Patent [19]

McMullin

[11] Patent Number: 5,809,128
[45] Date of Patent: Sep. 15, 1998

[54] METHOD AND APPARATUS PERMITTING NOTIFICATION AND CONTROL OF BLOCKED INCOMING CALLS OVER A DATA NETWORK

[75] Inventor: William P. McMullin, Bedford, Canada

[73] Assignee: Interactive Telecom Inc., Bedford, Canada

[21] Appl. No.: 742,052

[22] Filed: Nov. 1, 1996

[51] Int. Cl.$^6$ ............................. H04M 11/00; H04M 3/42
[52] U.S. Cl. ...................... 379/215; 379/93.35; 379/211; 370/352
[58] Field of Search ................................ 379/215, 93.35, 379/93.01, 201, 209, 211; 370/352

[56] References Cited

U.S. PATENT DOCUMENTS

| | | | |
|---|---|---|---|
| 4,852,151 | 7/1989 | Dittakavi et al. | 379/93.35 |
| 4,873,719 | 10/1989 | Reese | 379/215 |
| 4,876,711 | 10/1989 | Curtin . | |
| 4,947,421 | 8/1990 | Toy et al. | 379/215 |
| 4,969,184 | 11/1990 | Gordon et al. | 379/100.13 |
| 4,995,074 | 2/1991 | Goldman et al. . | |
| 5,046,188 | 9/1991 | Molnar . | |
| 5,195,130 | 3/1993 | Weiss et al. . | |
| 5,263,084 | 11/1993 | Chaput et al. | 379/215 |
| 5,287,401 | 2/1994 | Lin . | |
| 5,309,512 | 5/1994 | Blackmon et al. | 379/215 |
| 5,343,516 | 8/1994 | Callele et al. . | |
| 5,363,431 | 11/1994 | Schull et al. . | |
| 5,425,092 | 6/1995 | Quirk . | |
| 5,425,097 | 6/1995 | Pula | 379/215 |
| 5,432,616 | 7/1995 | Fukao et al. | 379/215 |
| 5,475,746 | 12/1995 | Miller et al. . | |
| 5,491,744 | 2/1996 | Kikinis | 379/215 |
| 5,513,251 | 4/1996 | Rochkind et al. | 379/93.35 |
| 5,519,767 | 5/1996 | O'Horo et al. | 379/93.35 |
| 5,533,102 | 7/1996 | Robinson et al. | 379/215 |
| 5,533,110 | 7/1996 | Pinard et al. | 379/201 |
| 5,604,796 | 2/1997 | Yamazaki | 379/215 |
| 5,608,786 | 3/1997 | Gordon | 370/352 |
| 5,610,910 | 3/1997 | Focsaneanu et al. . | |
| 5,651,060 | 7/1997 | Cohn et al. | 379/93.35 |
| 5,706,336 | 1/1998 | Kikinis | 379/93.35 |

FOREIGN PATENT DOCUMENTS

| | | | |
|---|---|---|---|
| 0732835 A2 | 9/1996 | European Pat. Off. . | |
| 9609714 | 3/1996 | WIPO | H04M 11/00 |
| 9620553 | 7/1996 | WIPO | H04M 3/50 |
| WO 96/38018 A1 | 11/1996 | WIPO . | |
| WO 97/20424 A1 | 6/1997 | WIPO . | |

OTHER PUBLICATIONS

IBM Technical Disclosure Bulletin vol. 37 No. 9 pp. 101–104 Sep. 1994.
IEEE Nov. 1989 Tencon '89, pp. 10–14, Shankar et al.
IEEE Jan. 1993 Communications Magazine, pp. 15–19, Burson et al.

*Primary Examiner*—Ahmad F. Matar
*Assistant Examiner*—Scott Wolinsky
*Attorney, Agent, or Firm*—Bennett, Jones, Vercheve

[57] ABSTRACT

Methods and apparatus are disclosed for providing automatic redirection of an incoming voice telephone call from a caller to a subscriber proxy when an attempt by the caller to connect to a telephone link of a public switched telephone network (PSTN) is blocked due to the telephone link being occupied by a subscriber using the telephone link to establish communications between the subscriber's personal computer and a computer network. The subscriber proxy is connected to both the PSTN and the computer network, and produces audio interaction with the caller. The subscriber proxy also notifies the subscriber of the incoming call via the subscriber's computer. The subscriber's computer can optionally be used by the subscriber to control and interact with the incoming call by communicating with the computer proxy while the subscriber continues to occupy the telephone link.

50 Claims, 5 Drawing Sheets

5,809,128

METHOD AND APPARATUS PERMITTING NOTIFICATION AND CONTROL OF BLOCKED INCOMING CALLS OVER A DATA NETWORK

FIELD OF THE INVENTION

This invention relates generally to public switched telephone network (PSTN) telecommunications systems which provide incoming telephone call notification, identification and call handling features to telephone subscribers. More specifically, this invention relates to a computer-telephone interface and methods to provide notification, identification and control of blocked incoming telephone calls (call attempts) for the subscriber when the subscriber is using the telephone link for computer dialogue over a dial-up data network to which the subscriber is connected either directly or indirectly.

BACKGROUND TO THE INVENTION

A subscriber can connect directly to a data network such as the Internet by establishing a telephone dial-up connection to a Data Communications Service (DCS) which is an Internet Service Provider (ISP). A subscriber can also connect indirectly to a data network such as the Internet by establishing a telephone dial-up connection to a DCS service which is a commercial online data service such as CompuServe or America Online, then use the Internet interconnection facilities of the commercial online data service to access the Internet. In either case, the subscriber establishes computer dialogue with the DCS via a dial-up connection using a telephone link connected to the Public Switched Telephone Network (PSTN).

The telephone link used by the subscriber is capable of use either for voice communications with other telephone subscribers or for data communications with a data communications service. Using the telephone link for voice or data communications occupies the telephone link and subsequent call attempts to the subscriber's telephone link are blocked from completion.

There are several types of dial-up connections possible depending on the type of service connection the subscriber has with the PSTN telephone service provider, or telephone carrier. For example, the subscriber can be provided with a telephone link that communicates over an analogue wire line, the so-called plain old telephone service or POTS. Alternately, the subscriber can be provided with a telephone link that communicates over a digital wire line such as the Integrated Services Digital Network or ISDN service offered by the telephone carriers. As a further alternative, the subscriber can be provided with a telephone link which communicates over a wireless radio band such as cellular telephone or personal communication service (PCS).

The Internet is a network of computers around the world which has become increasingly popular over the last few years. Commercial online data services such as CompuServe and America Online are examples of private data communications networks which have also become very popular over the last few years. There are numerous methods which consumers and businesses utilize to connect to these data communications services. The two most popular methods are via a temporary dial up modem connection over the PSTN, or via a dedicated connection either through the PSTN or through a private telephone connection. In either case, the user must connect to a data communications service (DCS) in order to access the Internet directly by connection to an Internet Service Provider (ISP) or indirectly through a commercial online service. Once connected to the DCS, the user's computer has access to the resources of the DCS and the user's computer literally becomes part of the DCS provider's network.

Should the user be connected via a temporary dial up modem connection over the PSTN, then the telephone link, which is used to make this connection between the user's computer and the telephone company, is held in an off hook state, typically for an extended period of time. For example, in an average voice call, the hold time for the call is in the range of 3 minutes, while the average hold time for a data call for Internet access is over 20 minutes. In addition to the longer hold times, the use of a telephone line for a data call requires the exclusive use of the line. Unlike a conventional voice telephone call between two phones, a modem connection between two modems over the PSTN cannot be interrupted or put in a held state while one of the parties to the call accepts a second incoming call. Where the off hook state is due to a voice based telephone interconnection, the caller receiving a second call attempt can be notified of the blocked call attempt through a feature known as "call waiting". The party receiving the call waiting notification can suspend the conversation with the first caller to engage in conversation with the incoming or second caller. On the other hand, where a data dialogue is occupying the subscriber's telephone link, the computers and modems managing the data dialogue are incapable of dealing with any audio notification of another call attempt through the "Call waiting" feature. Additionally, the computers or modems are not capable of suspending the current data dialogue to commence another voice or data communication with the inbound call. An attempt to do so would abort the existing connection between the two modems and computers as the protocol of communication between modems in a dial-up connection does not support any extended absence of end-to-end communications.

Such a system suffers a significant drawback, namely, that a subscriber using the telephone link for a data dialogue consequently puts their telephone link in an occupied or busy, off-hook state, typically for an extended period of time, thus making it difficult or impossible to notify the subscriber of an incoming telephone call.

The vast majority of persons connecting to a DCS do so through a temporary dial-up connection from their residence. The vast majority of residences are equipped with a single telephone link and, when this link is used to dial up to the DCS, the residence becomes unreachable by other incoming telephone calls. Persons attempting to reach such a residence during a dial-up session to the DCS will receive a busy signal, typically for an extended period of time. Furthermore, persons who access the DCS from within an apartment complex may be unable to receive notification of persons awaiting entry through the main entrance, as many apartment complexes utilize the PSTN as a notification system between the main entrance and each individual apartment unit.

A significant negative result of the above situation is that people become unreachable in emergencies and important situations unless there is intervention by the telephone company. Additionally, the telephone network is put under load by persons making many call attempts to reach the party whose telephone link is busy in an off hook state while connected to the DCS.

A number of systems have been developed to notify a called party during an existing voice telephone call of a second incoming call attempted on that same telephone link. One such system is commonly known as "Call Waiting" and has been discussed briefly above. Notification is typically via a series of audible tones delivered to the telephone handset of the subscriber that is receiving the incoming call. The subscriber is able to suspend the existing conversation to commence another conversation with the incoming caller. To accomplish this, the subscriber, if they wish to accept the second incoming call must put the first call on hold. This step is typically done by having the subscriber initiate a switch hook flash signal to the telephone company switch. This feature can only be used during a voice telephone call. An enhancement to the basic call waiting just described additionally delivers the calling party's telephone number to a telephone display provided on the subscriber's telephone handset equipment. This service is commonly known as visual call waiting and requires the subscriber to have special telephone equipment capable of receiving and displaying the calling party's telephone number.

The above systems all suffer the drawback that they cannot be used while the telephone link is busy on a dial-up connection to a DCS, as they are designed for use on a voice telephone connection only.

SUMMARY OF THE INVENTION

The present invention provides an improved telephone call notification, caller identification and control system which allows subscribers connected to a DCS through a dial-up connection over the PSTN to receive visual and/or audio notification, in real-time, of the call and to respond to the caller by making selections using computer input peripherals. This method provides advantages to subscribers over the current situation where no caller notification, identification or call control is available, as it eliminates busy signals to the calling party and provides instantaneous notification to the called subscriber even while the called subscriber's telephone link is in an off-hook state connected to a DCS.

In another manner of operation, the subscriber can be away from their home, while at work for example. Any calls to the subscriber's residence would be left unanswered. With the present invention, the subscriber could remotely monitor the unanswered calls from the second location by configuring and connecting their personal computer at work to the ISP which interconnects with the proxy of the present invention. In accordance with an illustrative embodiment of the present invention, a subscriber receives from a Message Transfer Point (MTP) incoming call notification to their computer screen while the dial-up connection to the DCS is maintained. The subscriber will receive notification of the call on their computer screen, and may optionally also receive information about the calling party, such as the calling party's telephone number, the calling party's name, and messages selected or input by the calling party through an Interactive Voice Response System (IVRS) at the MTP. The method provides the called subscriber with the ability to provide notification to the calling party, through the MTP, that the called subscriber's telephone link is busy on a dial-up connection to the DCS. The subscriber can, if they choose, acknowledge and control the incoming call through computer interaction with the MTP, via input and or output peripherals signifying to the calling party that the call has been acknowledged. Audio messages can be delivered to the calling party by way of subscriber interaction with the MTP which is connected to the IVRS, or which could be the same computer as the IVRS. The subscriber can ignore the incoming call, accept the incoming call after terminating the dial-up connection, redirect the incoming call to a voice mail system, or redirect the incoming call to another telephone number on the PSTN.

In one of its aspects the invention provides for a public switched telephone network providing telephone link blocked call redirection, a method permitting notification and control of redirected calls over a data communications network, the method comprising the steps of activating blocked call forwarding for a subscriber telephone link having a dial number associated therewith; providing a second dial number corresponding to a subscriber proxy for redirection of blocked calls to said subscriber telephone link; using said telephone link to connect a computer to said data communications network and receiving a unique data network address therefrom; establishing a data path over said data network to said subscriber proxy and providing said proxy with said subscriber dial number and said unique data network address; storing said subscriber dial number and said unique data network address; whereby blocked calls to said telephone link will be redirected to the subscriber proxy.

The present invention is especially (but not exclusively) suited for permitting subscribers to a service, such as the Internet or other commercial online service, to be notified of, and have call handling control over, incoming telephone calls to the subscriber telephone which is being utilized to connect to the service.

The present invention allows remote control of a telephone link. A subscriber is provided with the ability to be in one location while controlling the calls terminating at another location. Also the subscriber can monitor and control calls to multiple lines simultaneously.

One embodiment of the present invention permits the subscriber connected to the DCS to be notified of the incoming call on their computer while still maintaining an active connection to the DCS. The present invention also provides the method to deliver incoming call notification and control messaging over the same telephone link utilized by the subscriber to connect to the DCS without requiring the subscriber to hang up to free up the telephone link.

Furthermore, the caller attempting to reach the subscriber does not receive a busy signal and the caller is able optionally to deliver a message to the subscriber by way of the service or otherwise interact with the subscriber in the manner hereinafter described.

It will be apparent that additional call notification and control features can be accessed through the service. For example, incoming calls can receive different processing based on the originating number.

BRIEF DESCRIPTION OF THE DRAWINGS

A further understanding of the nature and advantages of the invention may be realized by reference to the remaining portions of the specification and drawings in which.

DETAILED DESCRIPTION OF THE INVENTION

Figure 1:
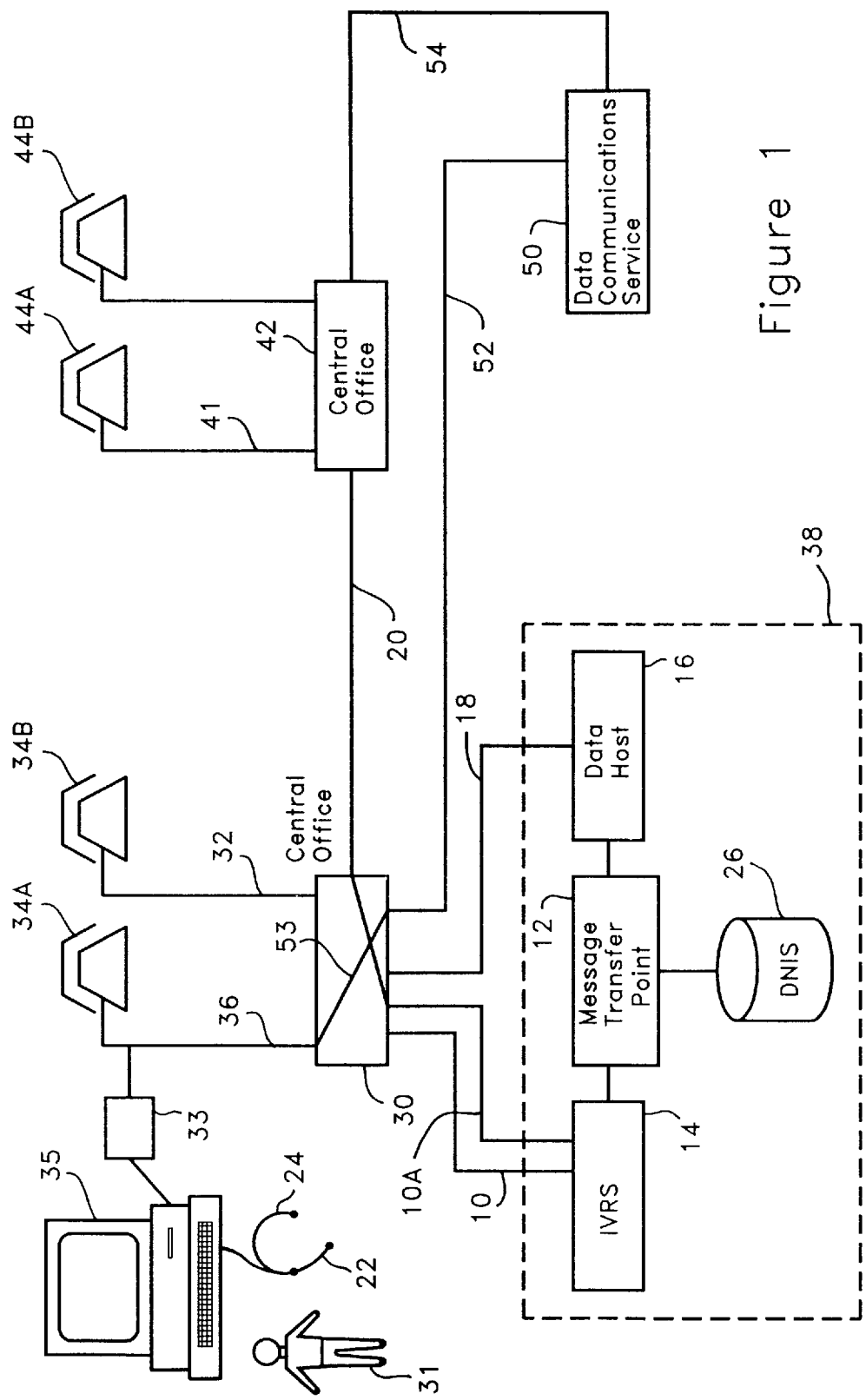
FIG. 1 is a schematic block diagram illustrating the physical components and telecommunications network that are used to support the preferred methods and processes of the present invention.

FIG. 1 illustrates a telecommunications system including local exchange central offices 30 and 42 connected by a trunk 20. The central offices 30 and 42 support a plurality subscribers each subscriber having a telephone link associated with telephones 34A, 34B, 44A, 44B, such links are shown at 32, 36 and 41. Modem 33 is also in communication with the central office over telephone link 36. The central offices 30 and 42 also support dedicated communications channels such as 18 and 54. The central offices 30 and 42 may consist, for example, of telecommunications switches such as a Northern Telecom DMS-100 (trademark) or AT&T 5ESS (trademark) switch.

An Interactive Voice Response System (IVRS) 14 is coupled to central office switch 30 through telephone link 10. The IVRS includes audio playback and record capabilities permitting recorded voice messages to be delivered to a caller's telephone 44A and to collect and store touch-tone entries made by callers using such telephones.

The switch of central office 30 is connected to the IVRS 14 by telephone link 10. The telephone link has an associated signaling channel 10A. The signaling channel is provided to communicate the called number to the IVRS to enable the IVRS to customize the interaction it has to relate to the subscriber line that the call was transferred from.

There are several options for delivery of the called number to the IVRS. The called number information could be delivered during call setup by way of the Integrated Services Digital Network call setup signaling. For POTS telephone or centrex, the called number information could be provided using the Simplified Message Desk Interface (SMDI). Other options are available using the Advanced Intelligent Network interface. Any of these options may be advantageously employed by one skilled in the art to obtain delivery of the called number to carry out the process of the present invention.

The switch of central office 30 is also connected to the Data Host (DH) 16 by dedicated communications channel 18 and to the Data Communications Service (DCS) 50 over telephone link 52. The switch of central office 42 is connected to the DCS by dedicated communications channel 54.

A Message Transfer Point (MTP) 12 is directly connected to the IVRS 14 and the DH 16 and functions as an intermediary by translating and transferring messages between the DH 16 and the IVRS 14. The MTP 12 accesses subscriber records from customer record file 26 which contains records for subscribers that are authorized to use the service. In addition, each subscriber's DNIS record contains real-time subscriber information relating to the status of the subscriber's telephone link (for example, link 36). Each subscriber link has a real-time record stored in the data store accessed by the MTP 12 so in the event a message or call is received by the IVRS 14 the MTP 12 can control the manner in which the IVRS 14 processes the message or call according to the status of the subscriber telephone link 36.

DH 16 is a computer host with a dedicated communications link to the DCS 50 through the switch of central office 30 which is coupled to the switch of central office 42 which has a dedicated communications channel 54 to the DCS. The dedicated link allows the DH and the DCS to communicate by providing a continuous communications path.

The DCS, through a data channel such as telephone link 52 also allows a subscriber using a dial-up data channel such as telephone link 36 to establish temporary dial-up data connections to the DCS 50, over the PSTN.

Table 1 is a flow listing which provides an overview of the steps associated with providing incoming call notification and control options in accordance with a preferred embodiment of the present invention. The steps of Table 1 should be considered with reference to FIGS. 1 and 2 in order to maintain a visual perspective of the elements and the steps.

TABLE 1

(1) A subscriber 31 desires to a make data connection to a data communications service (DCS) 50, such as that provided by an Internet Service Provider (ISP) or Commercial Online Service (COS).

(2) The subscriber 31, using a computer 35, modem 33 and a telephone link 36 connected to the PSTN, connects to the DCS 50 which is connected to the public switched telephone network through central office or CO 30, by dialing a predetermined dial number (DN).

(3) The subscriber 31 initiates a modem 33 call to the DCS 50 by instructing the computer 35 to dial a predetermined DN.

(4) The subscriber's local central office (CO) 30 routes the call to the DN of the DCS 50 service point over a telephone link 52 which connects the DCS 50 to the CO 30.

(5) The DCS 50 responds by accepting the call and going in an off hook state thereby establishing a circuit 53 through CO 30.

(6) The modem 33 and computer 35 of the subscriber 31 and the DCS 50 negotiate a connection protocol and speed over a circuit 53 bridging the subscriber telephone link 36 and a telephone link 52 of the DCS 50.

(7) Upon successful establishment of the connection protocol and speed over circuit 53, the subscriber 31 is requested to enter user identification and password information into the computer 35 which is communicated to DCS 50.

(8) Upon entry of such information, the DCS 50 authenticates the computer 35 of the subscriber and if successful, the subscriber computer 35 is granted access to the DCS 50.

(9) Immediately upon authentication of the subscriber provided information, the access granted over the data connection is assigned either an Internet Protocol (IP) address or other type of alphanumeric network address identifier as so chosen by the DCS 50. A numerical address identifier of either form is used to achieve successful routing of information between the subscriber's computer 35 and the DCS 50.

(10) The subscriber's computer 35 transmits through the modem 33, by way of the circuit 53, to the DCS 50 host by way of the dedicated communications channel 54 a message to the Data Host (DH) 16 located at the MTP 12, indicating that the subscriber's computer 35 has successfully initiated a connection to the DCS 50. The message may contain a subscriber identifier assigned the DCS in addition to the subscriber's network address as assigned by the DCS 50.

(11) The DH 16 in turn transmits a message to the MTP 12 where it is authenticated against an existing customer record file 26. If the subscriber identifier is found in the customer record file 26 at the MTP 12, a message is transmitted via the DCS 50 to the subscriber computer 35 indicating that subscriber information was received and authenticated successfully.

(12) Then, in the event a telephone call is attempted to the DN of the telephone link 36 of the subscriber, the CO 30 serving that DN prepares to forward the call to call busy forward dial number of the IVRS 14 by way of the PSTN.

(13) The CO 30 delivers, over signaling channel 10A, information about the original destination of the call through a service known as Dialed Number Identification Service (DNIS). The CO 30 may also deliver information identifying the origin of the call through a service known as Automatic Number Identification (ANI). Both DNIS and ANI are well known and will not be described here.

(14) Upon reception of DNIS and any supplied ANI information, and prior to the IVRS 14 accepting the call, IVRS validates the DNIS information against the subscriber records located in the customer record file 26 of the MTP 12 to ensure that the subscriber DN is a valid subscriber DN authorized to use the service. The DN is also used to validate the existence of an active modem connection between the subscriber computer 35 and the DCS 50.

(15) If the DNIS information is validated, the IVRS 14 transmits a message over the signaling channel 10A to the CO 30 acknowledging and accepting the call.

(16) If the existence of an active modem connection on circuit 53 was established, concurrent with acceptance of the call, the IVRS 14 delivers to the MTP 12 notification that a call has been established with the caller's telephone 44A in addition to delivering the ANI of the caller's telephone 44A.

(17) The MTP 12, once again, validates the existence of a modem connection on circuit 53 between the subscriber and the DCS 50.

(18) If circuit 53 is still established, the MTP 12 sends a message by way of the DH 16 to the subscriber computer 35 over the dedicated network circuit bridging dedicated communications channels 18 and 54. This may occur through one CO 30 or by way of a plurality of COs such as CO 30 and CO 42 which are coupled together by trunk 20 as illustrated in FIG. 1.

(19) Upon acceptance of the call, a voice path is established over telephone link 10 between the caller's telephone 44A and the IVRS 14.

(20) The IVRS 14, immediately upon acceptance of the call, delivers an audio message to the caller's telephone 44A, which can optionally be prerecorded by the subscriber.

(21) In the event the ANI information was not delivered from the CO 30, or is not available, the IVRS 14 can produce an audio message audible from caller's telephone 44A requesting the caller to input their originating telephone number using a touch-tone phone. The caller entry will replace the previously absent ANI information.

(22) Upon delivery of the notification message to the subscriber computer 35, the subscriber software residing on the subscriber's computer 35, notifies the subscriber 31 by way of visual and or audio notification. The audio notification could include a tone signal while the visual notification will include presentation of the ANI information as captured and delivered by the IVRS 14.

(23) Upon presentation of the caller information, the subscriber 31 can utilize a computer input device to select or input a response to be delivered to the caller's telephone 44A. The input device used by the subscriber 31, in conjunction with the subscriber software, can select a number of predefined options. Each option directly correlates to a specific identifier which is delivered to the DH 16.

(24) Upon successful receipt of the identifier by the DH 16, the DH 16 delivers the identifier to the MTP 12. The MTP 12 validates the identifier and determines whether the identifier correlates to an audio message or to a call handling instruction.

(25) In the event the identifier correlates to an audio message, a signal is transmitted to the IVRS 14 from the MTP 12, which executes the delivery of a specific audio file over the voice path to the caller which is a bridging of telephone link 10 and telephone link 41 through CO 42 and 30 connected by trunk 20.

(26) If the identifier correlates to a call handling instruction, a signal is transmitted to the IVRS 14 which redirects the voice path to a voice mail system at the IVRS 14 or to another destination number on the PSTN.

(27) In the event the call handling instruction requires the voice path be redirected to the same directory number DN of the subscriber link 36 currently being utilized by the subscriber computer 35 and modem 33, the voice path between the caller's telephone 44A and the IVRS 14 is delayed from being redirected until the DCS 50 transmits a message to the DH 16 indicating that modem 33 has disconnected from the DCS 50.

Figure 2:
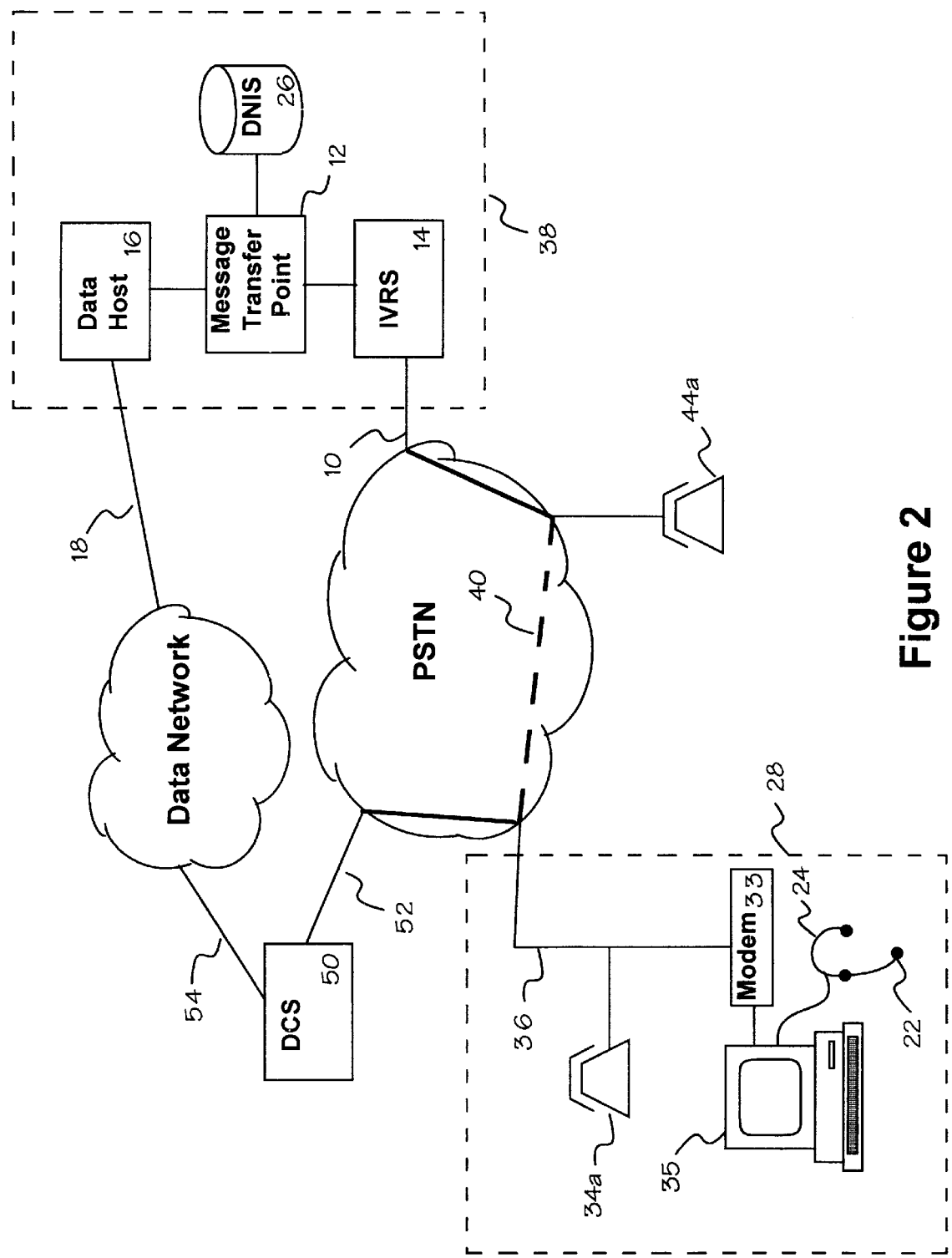
FIG. 2 is a functional block diagram illustrating the logical elements of a preferred embodiment of the system of the present invention.

Reference is now made to FIG. 2, which shows a functional block diagram of the logical network elements interconnected with a called party proxy 38 which is advantageously employed to provide an audio interactive voice response to a calling party that attempts to call a subscriber whose telephone link is busy. The elements of which that are the same as those in FIG. 1 are identified by the same reference numbers.

In the operation of a telephone system, a first caller to a subscriber's dial number is signaled to the subscriber by a ringing of the handset 34A located at the subscriber premises 28. A ring tone is provided to the calling party to indicate ringing of the called party's handset. Where the subscriber is already using the telephone link 36, the second caller's telephone 44a is said to be blocked and a blocking tone is provided to the second caller. This blocking tone is commonly referred to as a "busy signal" and advises the calling party that the called subscriber is using their telephone link 36 for another communication. The calling party can wait and try to call at a later time in the hope that the subscriber will have made the telephone link available to receive other incoming calls.

Telephone service providers have enhanced the useability of the telephone system to provide a "call forward busy/no answer" feature to call placement within the telephone system providing an alternative to blocked calls as just described. Subscribers are provided the capability of directing callers to another telephone number in the event that their number is busy or was not answered after a pre-selected number of rings. When a caller using telephone 44a attempts to call a subscriber whose telephone link 36 is busy, as indicated by dashed line 40, the caller is automatically redirected to a second subscriber provided telephone number served by telephone link 10. To employ the present invention, the subscriber can provide a call forward busy/no answer number which directs blocked calls or unanswered calls to their called party proxy connected to the PSTN by telephone link 10. As can be appreciated, the invention may be advantageously employed without any direct programing or installation by the telephone service provider other than to have the telephone service provider provide the capability of the "call forward busy/no answer" feature for the subscriber's telephone link. When the call forward busy/no answer feature is enabled by a subscriber, any calls directed to that subscriber's telephone number are automatically routed to the alternate dial number selected by the subscriber when activating the call forward/busy/no answer feature. Thus, a subscriber can provide the dial number corresponding to their proxy when activating the call forward busy/no answer feature whereupon subsequent callers to their dial number will be automatically routed to the proxy without any further intervention from the subscriber and without any extra steps or intervention by the calling party.

In the circumstances where a subscriber has activated the call forward busy/no answer feature and the subscriber is using their telephone link 36 and a second call is placed to the subscriber's dial number, the call is automatically routed to the proxy telephone link 10. Connected to proxy telephone link 10 is an interactive voice response system (IVRS) 14 which receives the incoming call. The proxy has many ways of dealing with such incoming calls, as exemplified here for further clarity.

The IVRS 14 requires information about the original destination of the call to handle the incoming call properly. The original dial number destination is provided to the IVRS under a standard telephone company service offering known as the "Dialed number Identification Service" (DNIS). The original destination of the call is that of the subscriber that the caller intended to call but was unable to do so as the subscriber was using their telephone link 36 resulting in the caller's call being forwarded to the IVRS.

Figure 3:
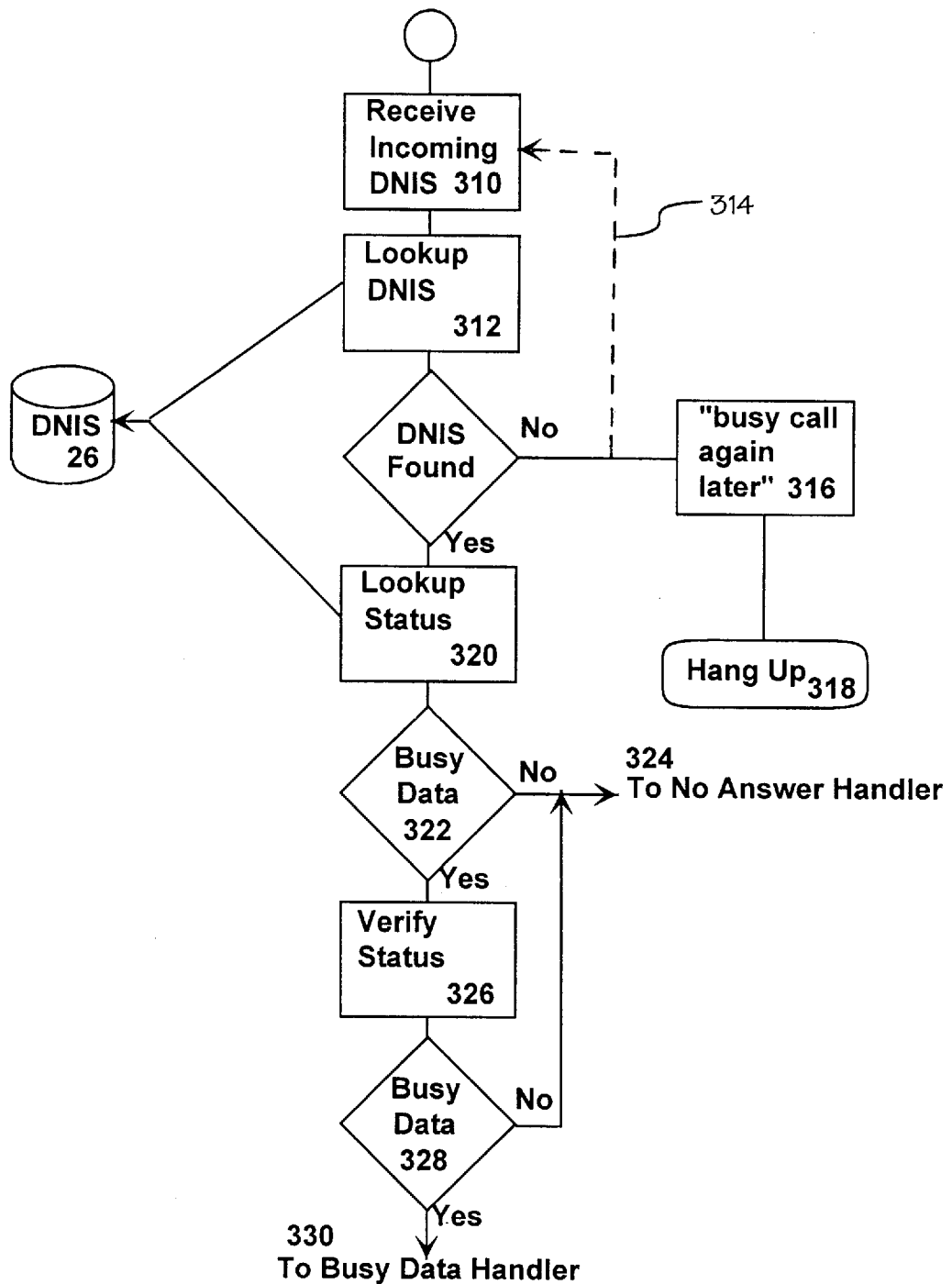
FIG. 3 is a flowchart showing an incoming caller handling process.

The IVRS, serving as a proxy for the subscriber, processes the incoming call in the manner generally set out in the flowchart of FIG. 3. The subscriber's dial number is received as at 310 in accordance with the process for the Dialed Number Identification Service (DNIS). A lookup 312 of the dial number so obtained is made in the store of registered dial numbers contained within the customer record file 26 to determine if this subscriber is served by a proxy. If there is no match, the call can be ignored, that is to say the link can be left to ring and ring without answer and the IVRS will simply wait for the next incoming DNIS, as shown by the upward extending dashed line 314. Alternately, a no match call could be answered (that is, go off hook and establish a communications path with the caller) using a standard audio greeting to the effect that "the called number is busy or was not answered, please try again later" as shown in box 316. The IVRS would then hang up the link to disconnect the caller as shown at 318.

Figure 4:
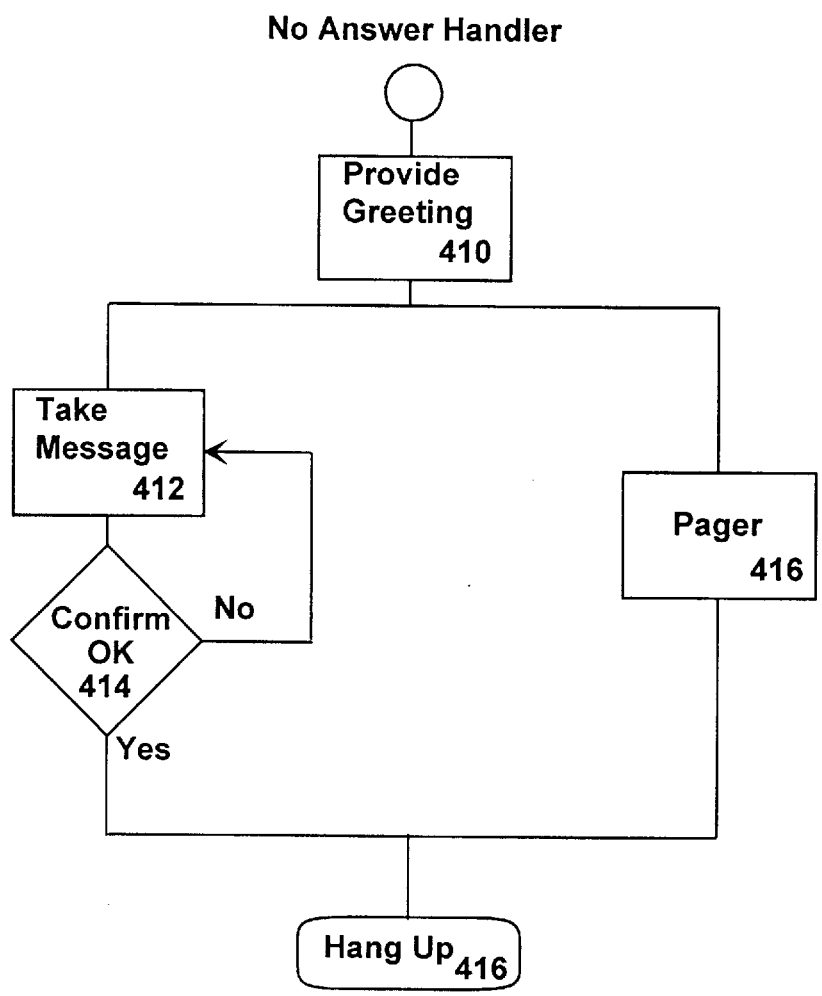
FIG. 4 is a flowchart showing a no answer handler process.

If the DNIS lookup was successful, then the IVRS next looks at the particulars of the information for the subscriber as at 320. In particular, it examines the BUSY DATA status field or register 322 which is a field set to YES when the subscriber that was called is engaged in a data dialogue. The BUSY DATA field is set to NO at all other times. If the BUSY DATA status field is set YES, this brings into play the additional call handling features to process the caller's call. It will be understood that the BUSY DATA status YES/NO can be represented in any suitable manner such as 1/0, Y/N or some other such equivalence.

Where the BUSY DATA status is NO, the subscriber is either talking on the telephone or wasn't there to answer the caller's incoming telephone call resulting in the call. In this case, indicated at 324, the proxy can process the call in the exemplary manner shown in FIG. 4. This call processing may be similar to an answering machine function and may simply provide a greeting as at 410 ("Hi, I'm on the phone or unable to take your call right now, please leave a massage. . .") and take a message 412 from the caller. The exemplary call processing flowchart of FIG. 4 has the additional optional step of interrogating the caller at the conclusion of the message to obtain confirmation that the caller is satisfied with the message and give the caller the opportunity to record a replacement message if the first was not satisfactory. This is shown at 414. Once the message has been taken, the telephone call is terminated by the proxy simply hanging up the link (ie go on hook) 416.

Optionally and by way of further example, the subscriber may have a pager service that could be accessible to callers. Where the subscriber has such a service, the caller may be greeted as at 410 and provided with the option to contact the subscriber via a pager ("Hi, I'm on the phone or unable to take your call right now, please leave a message to have me paged"). A pager contact process 416 for the caller is then initiated.

Referring again to FIG. 3, where the BUSY DATA status is YES, a status confirmation process 326 is preferably initiated to confirm that the subscriber is still engaged in the data dialogue. The proxy message transfer point initiates the confirmation process by having the proxy data handler send an enquiry message over the data network, such as the Internet, to the subscriber's computer. The subscriber's computer would automatically without user intervention prepare a response confirmation message for routing back to the proxy data handler. When the proxy data handler sends an enquiry data message, the response confirmation message must be received within a preselected time limit 328. This confirmatory process 326 and 328 is intended to ensure that the YES status wasn't simply left over from a previous computer dialogue session or otherwise in error. Confirmation of the BUSY DATA status results in a busy data handler process 330 which is described with reference to FIG. 5. In the event that the confirmatory process message exchanges did not successfully complete, the caller is routed to the Busy/No Answer process 324 previously described with reference to FIG. 4.

Figure 5:
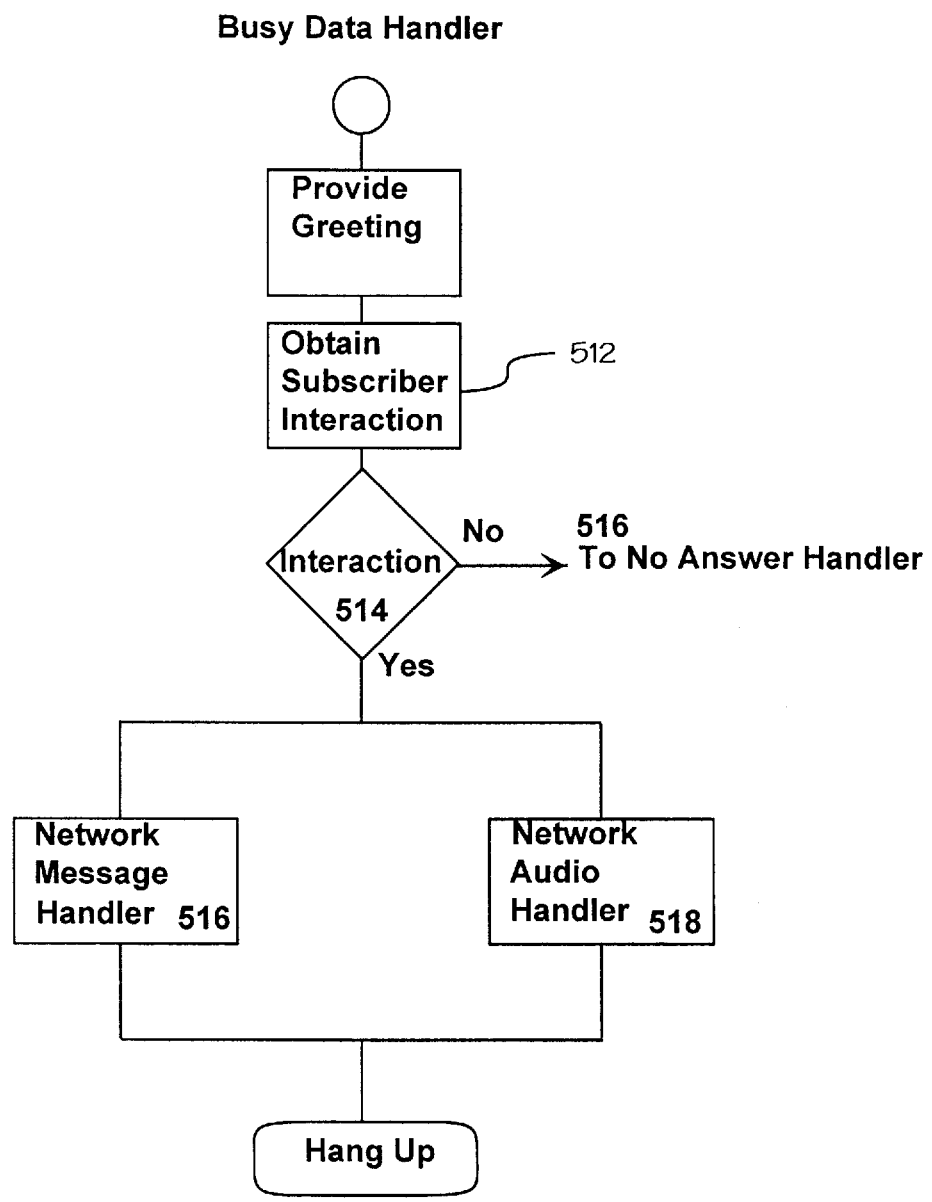
FIG. 5 is a flowchart showing a caller handler process where the called subscriber is occupying the telephone link on a data network call.

FIG. 5 provides a flowchart for the BUSY DATA process to which the caller is routed to when the called subscriber is active in a data use of the subscriber's telephone link. In such a communications state, the blocked caller routed to the subscriber's proxy is now provided with many more options for contacting the subscriber. The proxy call handling process could now include not only the message and pager options for the caller described with reference to FIG. 4, but also delivery of notification messages to the subscriber to obtain interaction from the subscriber as shown at 512. The notification messages are delivered over the data network, such as the Internet, on a real time basis to the subscriber's computer.

The notification messages received at the subscriber's computer can be acted upon by the subscriber's computer in several different ways. The subscriber's computer can process the notification message into a visually perceptible message for display on the subscriber's computer screen. The visually perceptible message indicates that a telephone caller has been routed to the proxy. The subscriber's computer can additionally process the notification message by initiating an audio notification aurally perceptible by the subscriber. The audio notification could be a simple ringing, chiming or tone signal and can be combined with the visually perceptible message.

Upon perception of the presence of a caller interacting with the subscriber's proxy, the subscriber can take one of several steps. The subscriber can take no action and the proxy data handler is not then able to provide the message transfer point with a subscriber response message as indicated at 514. The message transfer point will process the lack of notification of subscriber instructions from the subscriber's computer as an indication that the subscriber is not at that time interacting with the computer and is therefor unable to provide instructions or messages to the proxy for dealing with the caller. The proxy message transfer point will then default to the no answer handler as shown at 516 to take a message from the caller in the same fashion as described previously with reference to FIG. 4.

If the subscriber does interact with his or her computer to direct messages over the data network, such as the Internet, to the proxy data host, these will be acted upon by the proxy to provide audio messages instructing the caller. For example, the subscriber could decide to disconnect the computer from the telephone link to free up the telephone link to receive incoming calls. The subscriber would interact with his or her computer to input this intention to the computer which would forward a message to that effect over the data network or Internet to the proxy as at 516.

Upon receipt of such a message, the proxy IVRS would provide an audio message to the caller, to the effect "I am going to free up my telephone line in just a few moments, please hang up this call and call again to speak to me directly". Thus the caller would be able to initiate another call to the subscriber. Another more convenient and preferred method of handling the call would be to have the IVRS transfer the call from the caller to the subscriber when the subscriber's line is free. This step can be done by having the IVRS wait a pre-determined time, such as 15 seconds, to allow the subscriber time to disconnect and free up the line to receive the transferred called. Alternately, instead of the proxy waiting a predetermined time such as 15 seconds, the subscriber's PC could be configured to repeatedly send notification messages to the proxy at short pre-determined time intervals, such as every 2 seconds. When the notification messages stop arriving at the proxy, that condition would indicate that the subscriber has disconnected and is ready to accept transfer of the call.

In another option, the subscriber's computer can be configured to include an voice audio input path such as a microphone 22 and voice audio output path such as headphones 24 or speakers connected to suitable equipment within the computer such as a sound card. To process voice signaling, the subscriber's computer 35 would also require an Internet telephone system program capable of delivering messages carrying digital message representations of a voice conversation over the Internet. Such software programs are available and include Webphone (trademark) by way of example. The proxy IVRS would be similarly equipped with the necessary software and hardware to interconnect the caller with the sound equipment of the proxy. The subscriber could input commands into his or her computer indicating an intention to carry out a telephone conversation over the Internet using the Webphone (trademark) software and messages to that effect would be transmitted to the proxy to establish the necessary data path and interconnections as at 518 to have the caller bridged to the subscriber over a message path capable of carrying a voice conversation between the caller and the subscriber all without disconnecting the subscriber from the data services he or she was using. To inform the caller of the subscriber's intention to set up an audio bridge over the Internet, the proxy might provide an informational audio message to the caller to keep the caller on the telephone long enough for the necessary setups to occur. An example audio message produced by the proxy while the setup is occurring might be "Just a moment, while I set up my telephone to speak with you please".

While the invention has been described with reference to a preferred embodiment, the invention is not limited thereto but all manner of equivalent constructions and substitutions that may be made that are within the spirit of the invention as defined in the claims appended hereto.

I claim:

1. In a public switched telephone network providing telephone link blocked call redirection, a method permitting notification and control of redirected calls over a data communications network, the method comprising the steps of:

using a telephone link to connect a computer to a data communications service (DCS) via said data communications network;

receiving a unique data network address from said DCS;

establishing a data path over said data network to a subscriber proxy; and using said data path to provide said proxy with a message containing a dial number and said unique data network address.

2. The method of claim 1 further including the steps of:

receiving a call waiting message at said computer corresponding to a telephone call to said dial number; and processing said call waiting message to produce an output perceptible by a person.

3. The method of claim 2 in which said call waiting message includes caller identification information.

4. The method according to claim 3 where said caller identification information includes automatic number identification.

5. The method according to claim 3 where said caller identification information includes calling line identification information.

6. The method of claim 2 further including the step of:

communicating a control message to said proxy operable to cause the proxy to establish a voice path between the proxy and said telephone call.

7. The method of claim 6 further including the step of:

communicating a control message to said proxy operable to cause the proxy to provide a selected pre-recorded audio message to said voice path.

8. The method of claim 2 further including the step of:

communicating a control message to said proxy operable to instruct the proxy to establish a communications path between said computer and said telephone call.

9. The method of claim 8 further including the steps of:

converting audible sounds proximate to said computer into digital audio messages representative of said sounds; and providing said digital audio messages to said communications path.

10. The method of claim 8 further including the step of:

receiving digital audio messages over said communications path and converting said digital messages to corresponding audible sounds.

11. The method of claim 10 further including the steps of:

converting audible sounds proximate to said computer into digital audio messages representative of said sounds; and providing said digital audio messages to said communications path.

12. The method of claim 2 where said output comprises messages visually perceptible on a video display connected to said computer.

13. The method of claim 12 where said output includes audible sounds.

14. The method of claim 2 where said output includes audible sounds.

15. In a public switched telephone network (PSTN) providing telephone link blocked call redirection, a method permitting notification and control of redirected calls over a data communications network, the method comprising the steps of:

receiving a message over said data communications network containing a subscriber dial number and a unique data network address;

storing said subscriber dial number and said unique data network address;

receiving a telephone call forwarded by the PSTN;

obtaining dialed number information from the PSTN;

comparing the dialed number information to stored subscriber dial number information; and for matching number information, providing a call waiting message to said data network addressed to said unique data network address corresponding to the dialed number information.

16. The method of claim 15 further including the step of:

receiving caller identification information from the PSTN and including said caller identification information in said call waiting message.

17. The method according to claim 16 where the caller identification information includes automatic number identification information.

18. The method according to claim 16 where the caller identification information includes calling line identification information.

19. The method of claim 15 further including the step of:

periodically transmitting messages to said unique data network address requesting a reply for confirmation of the presence of a computer at said unique data network address.

20. The method of claim 15 further including establishing a voice path connection with the PSTN.

21. The method of claim 20 including providing a pre-recorded audio message to said voice path.

22. The method of claim 20 including providing a pre-recorded audio message to said voice path, said message corresponding to the dialed number information.

23. The method of claim 20 including the steps of:

receiving a control message over said data network corresponding to said unique data network address; and providing a selected pre-recorded audio message to said voice path dependent on the control message contents.

24. The method of claim 23 further including the steps of:

receiving digital audio messages from said unique data network address; and converting said digital messages to corresponding audio signaling for insertion into said voice path.

25. The method of claim 20 further including the steps of:

converting audio signaling from the voice path to received digital audio messages representative of said audio signaling; and providing said received digital audio messages to the data network addressed to said unique data network address.

26. The method of claim 20 further including the steps of:

receiving digital audio messages from said unique data network address: and converting said digital messages to corresponding audio signaling for insertion into said voice path.

27. In a public switched telephone network (PSTN) providing telephone link blocked call redirection, a method permitting notification and control of redirected calls over a data communications network, the method comprising the steps of:

activating blocked call forwarding for a subscriber telephone link having a subscriber dial number associated therewith;

providing a second dial number corresponding to a subscriber proxy for redirection of blocked calls to said subscriber telephone link;

using said telephone link to connect a computer to a data communications service (DCS) via said data communications network;

receiving a unique data network address from said DCS; and establishing a data path over said data network to said subscriber proxy and providing said proxy with said subscriber dial number and said unique data network address.

28. The method of claim 27 including the steps of:

receiving a blocked call forwarded by the PSTN to said second dial number;

obtaining dialed number information from the PSTN;

comparing the dialed number information to stored subscriber dial number information; and for matching number information, providing a call waiting message to said data network addressed to said unique data network address corresponding to the dialed number information.

29. The method of claim 28 further including the steps of:

receiving said call waiting message at said computer; and the computer processing said call waiting message to produce an output perceptible by a person.

30. The method of claim 29 in which the proxy receives caller identification information from the PSTN and includes said caller identification information in said call waiting message.

31. The method according to claim 30 where the caller identification information includes automatic number identification information.

32. The method according to claim 30 where the caller identification information includes calling line identification information.

33. The method of claim 29 where said output comprises messages visually perceptible on a video display connected to said computer.

34. The method of claim 33 where said output includes audible sounds.

35. The method of claim 29 where said output includes audible sounds.

36. The method according to claim 29, further including the steps of:

establishing a voice path between the blocked call and the proxy;

said computer delivering a selection message to said data network;

said proxy receiving said selection message from said data network and converting said selection message to a corresponding audio message; and inserting said corresponding audio message into said voice path.

37. The method of claim 28 further including the step of:

the proxy answering said blocked call to establish a voice path over the PSTN.

38. The method of claim 37 including providing pre-selected audio messages to said voice path.

39. The method of claim 37 further including the steps of:

converting audio signaling from the voice path to received digital audio messages representative of said audio signaling;

delivering said received digital audio messages to the data network addressed to said unique data network address; and said computer receiving said digital audio messages and converting said digital messages to corresponding audible sounds.

40. The method of claim 39 further including the steps of:

converting audible sounds proximate to said computer into digital audio messages representative of said sounds;

delivering said digital audio messages to the data network addressed to said proxy; and receiving said digital audio messages and converting said digital messages to corresponding audio signaling for insertion into said voice path.

41. The method of claim 37 further including the steps of:

converting audio signaling received from the voice path to digital messages representative thereof;

delivering said digital messages to said data network addressed to said unique data network address;

said computer receiving and processing said digital messages into corresponding audible sounds;

said computer having a microphone responsive to sounds proximate thereto for producing electrical signaling representative of such proximate sounds;

processing microphone signaling into subscriber audio messages representative thereof;

delivering said subscriber audio messages to said data network addressed to said proxy; and the proxy receiving said subscriber audio messages from said data network and converting said subscriber audio messages into corresponding audio signaling for insertion into said voice path.

42. The method of claim 37 further including the step of inserting pre-recorded voice instructions into said voice path.

43. The method of claim 37 further including the steps of:

converting audio signaling from said voice path to received audio messages representative thereof; and storing said received audio messages.

44. The method of claim 27 further including the step of:

said proxy periodically confirming the presence of said computer at said unique data network address.

45. Apparatus including computer readable media having structure storing computer executable instructions comprising:

means for using a telephone link to connect a computer to a data communications service (DCS) via data communications network;

means for receiving a unique data network address from said DCS;

means for establishing a data path over said data network to a subscriber proxy; and means for using said data path to provide said proxy with a message containing a dial number and said unique data network address.

46. Apparatus of claim 45 wherein the computer readable media includes media selected from at least one of:

magnetically recordable diskettes;

optically recordable read only memory (CD-ROM); or magneto-optical recordable media.

47. Apparatus including computer readable media having structure storing computer executable instructions comprising:

means for receiving a message over a data network containing a subscriber dial number and a unique data network address;

means for storing said subscriber dial number and said unique data network address;

means for receiving a telephone call forwarded by a public switched telephone network (PSTN);

means for obtaining dialed number information from the PSTN;

means for comparing the dialed number information to stored subscriber dial number information; and means for, for matching number information, providing a call waiting message to said data network addressed to said unique data network address corresponding to the dialed number information.

48. Apparatus of claim 47 wherein the computer readable media includes media selected from at least one of:

magnetically recordable diskettes;

optically recordable read only memory (CD-ROM); or magneto-optical recordable media.

49. Apparatus including computer readable media having structure storing computer executable instructions comprising:

means for activating blocked call forwarding for a subscriber telephone link having a subscriber dial number associated therewith;

means for providing a second dial number corresponding to a subscriber proxy for redirection of blocked calls to said subscriber telephone link;

means for using said telephone link to connect a computer to a data communications service (DCS) via a data communications network;

means for receiving a unique data network address from said DCS; and means for establishing a data path over said data network to said subscriber proxy and providing said proxy with said subscriber dial number and said unique data network address.

50. Apparatus of claim 49 wherein the computer readable media includes media selected from at least one of:

magnetically recordable diskettes;

optically recordable read only memory (CD-ROM); or magneto-optical recordable media.

* * * * *